`US011405261B1`

(12) United States Patent
Myla et al.

(10) Patent No.: US 11,405,261 B1
(45) Date of Patent: Aug. 2, 2022

(54) OPTIMIZING BANDWIDTH UTILIZATION WHEN EXPORTING TELEMETRY DATA FROM A NETWORK DEVICE

(71) Applicant: Juniper Networks, Inc., Sunnyvale, CA (US)

(72) Inventors: John Myla, Santa Clara, CA (US); Swamy Sadashivaiah Kananda, Sunnyvale, CA (US); Avinash Reddy Singireddy, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 97 days.

(21) Appl. No.: 16/948,272

(22) Filed: Sep. 10, 2020

(51) Int. Cl.
*H04L 41/0654* (2022.01)
*H04L 43/0817* (2022.01)
*H04Q 9/04* (2006.01)

(52) U.S. Cl.
CPC ...... *H04L 41/0654* (2013.01); *H04L 43/0817* (2013.01); *H04Q 9/04* (2013.01); *H04Q 2209/826* (2013.01)

(58) Field of Classification Search
CPC ... H04L 41/0654; H04L 43/0817; H04Q 9/04; H04Q 2209/826
USPC ........................................................ 370/216
See application file for complete search history.

(56) References Cited

U.S. PATENT DOCUMENTS

| 7,301,475 | B2 * | 11/2007 | Salazar Cardozo | ... G01D 4/004 705/412 |
| 9,143,412 | B1 * | 9/2015 | Nay | ......................... H04L 67/12 |
| 9,332,277 | B2 | 5/2016 | Hsieh et al. | |
| 2002/0167420 | A1 * | 11/2002 | Rodi | ................... G01D 5/24419 341/6 |
| 2003/0069952 | A1 | 4/2003 | Tams et al. | |
| 2009/0007197 | A1 * | 1/2009 | Turner | ............... H04N 21/2665 725/88 |
| 2012/0192016 | A1 * | 7/2012 | Gotesdyner | ......... H04L 12/6418 714/E11.179 |
| 2014/0249777 | A1 * | 9/2014 | Tanaka | ............... G05B 23/0232 702/183 |

(Continued)

FOREIGN PATENT DOCUMENTS

CN          101667876 A          3/2010

OTHER PUBLICATIONS

Cisco UCS Manager System Monitoring Guide, Release 3.1, Statistics Collection Policy Configuration, Jul. 28, 2019, 12 Pages.

*Primary Examiner* — Meng Vang
(74) *Attorney, Agent, or Firm* — Harrity & Harrity, LLP

(57) ABSTRACT

A network device may receive, from a collector device, a request for telemetry data associated with service interfaces and counters of the network device. The network device may determine, based on the request, a first quantity of the service interfaces and a second quantity of the counters. The network device may determine a first time interval to send delta values of the telemetry data associated with the service interfaces and the counters, and a second time interval to send absolute values of the telemetry data, based on the first time interval, the first quantity of the service interfaces, and the second quantity of the counters. The network device may provide, to the collector device, the absolute values of the telemetry data based on the second time interval and may provide, to the collector device, the delta values of the telemetry data based on the first time interval.

20 Claims, 11 Drawing Sheets

(56) References Cited

U.S. PATENT DOCUMENTS

2018/0019952 A1* 1/2018 Li ........................... H04L 69/16
2019/0317829 A1* 10/2019 Brown ................ G06F 11/3442
2020/0372806 A1* 11/2020 Wang ...................... H04L 67/18

* cited by examiner

OPTIMIZING BANDWIDTH UTILIZATION WHEN EXPORTING TELEMETRY DATA FROM A NETWORK DEVICE

BACKGROUND

A network device may automatically collect and send telemetry data to a collector device to allow the collector device to monitor the network device.

SUMMARY

In some implementations, a method includes receiving, by a network device and from a collector device, a request for telemetry data associated with service interfaces and counters of the network device; determining, by the network device and based on the request, a first quantity of the service interfaces and a second quantity of the counters associated with the network device; determining, by the network device, a first time interval to send delta values of the telemetry data associated with the service interfaces and the counters; determining, by the network device, a second time interval, to send absolute values of the telemetry data, based on the first time interval, the first quantity of the service interfaces, and the second quantity of the counters; providing, by the network device and to the collector device, the absolute values of the telemetry data based on the second time interval; and providing, by the network device and to the collector device, the delta values of the telemetry data based on the first time interval.

In some implementations, a network device includes one or more memories; and one or more processors to: receive, from a collector device, a request for telemetry data associated with service interfaces and counters of the network device; determine, based on the request, a first quantity of the service interfaces and a second quantity of the counters associated with the network device; determine a first time interval to send delta values of the telemetry data associated with the service interfaces and the counters; determine a second time interval, to send absolute values of the telemetry data, based on the first time interval, the first quantity of the service interfaces, and the second quantity of the counters; provide, to the collector device, the absolute values of the telemetry data based on the second time interval; provide, to the collector device, the delta values of the telemetry data based on the first time interval; receive, from the collector device, an instruction to perform a corrective action based on the absolute values of the telemetry data and the delta values of the telemetry data; and perform the corrective action based on the instruction.

In some implementations, a non-transitory computer-readable medium storing a set of instructions includes one or more instructions that, when executed by one or more processors of a network device, cause the network device to: receive, from a collector device, a request for telemetry data associated with the network device, wherein the telemetry data includes one or more of: data provided to service interfaces of the network device, or data stored by counters of the network device; determine, based on the request, a first quantity of the service interfaces and a second quantity of the counters associated with the network device; determine a first time interval to send delta values of the telemetry data; determine a second time interval, to send absolute values of the telemetry data, based on the first time interval, the first quantity of the service interfaces, and the second quantity of the counters; provide, to the collector device, the absolute values of the telemetry data based on the second time interval; and provide, to the collector device, the delta values of the telemetry data based on the first time interval.

DETAILED DESCRIPTION

Figure 1A:
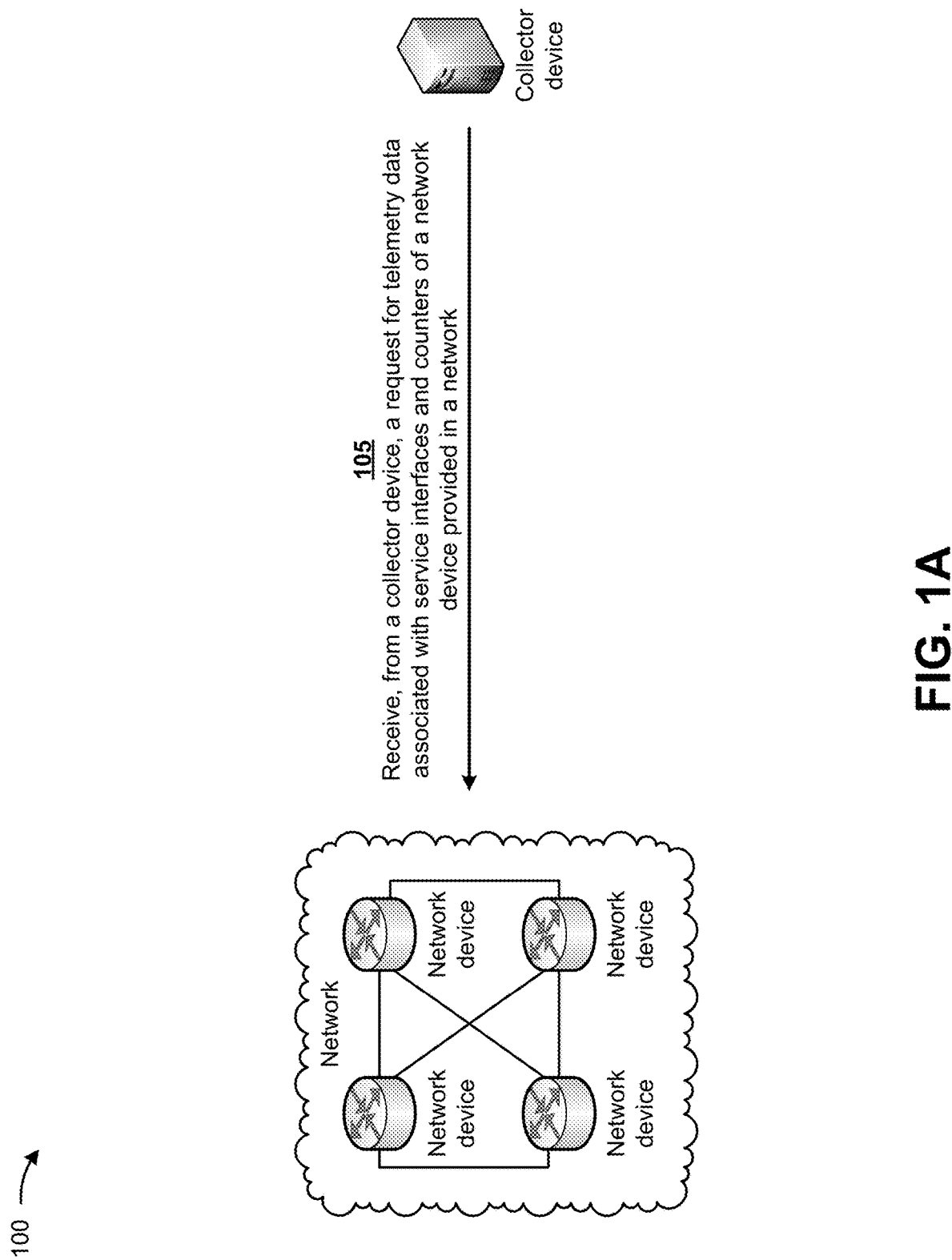
FIGS. 1A-1E are diagrams of an example implementation described herein.

The following detailed description of example implementations refers to the accompanying drawings. The same reference numbers in different drawings may identify the same or similar elements.

In many instances, a network device sends telemetry data to a collector device to allow the collector device to monitor the network device. The telemetry data may include information concerning one or more resources of the network device, such as a service interface, an interface queue, a filter, a label switch path, a counter (e.g., associated with the service interface), and/or the like, of the network device. The collector device analyzes the telemetry data to determine a status of the network device, a health of the network device, and/or the like. In some cases, the collector device may send instructions to the network device (e.g., based on the determined status of the network device, the determined health of the network device, and/or the like) to maintain and/or improve a performance of the network device.

The telemetry data may include information concerning the one or more resources of the network device at a particular time. However, when the network device has vast amounts of resources (e.g., hundreds, thousands, tens of thousands, and/or the like, of resources) a size of the telemetry data associated with the resources at the particular time may be large (e.g., tens of megabytes (MB), hundreds of MB, thousands of MB, and/or the like). When the network device is to send the telemetry data based on a particular time interval (e.g., every 2 seconds), the network device may not be able to send all of the telemetry data within the particular time interval. This prevents the collector device from obtaining enough information to accurately determine the status of the network device, the health of the network device, and/or the like. Additionally, this prevents the network device from timely and/or regularly exporting particular telemetry data associated with particular resources of the network device, which causes the particular telemetry data to be stale by the time the collector device receives the particular telemetry data. Alternatively, the network device may send the telemetry data based on a longer time interval than the particular time interval, which allows the collector device to receive all the telemetry data associated with the particular time, but the telemetry data may be stale by the time the collector device receives all of the telemetry data. This prevents the collector device from accurately determining a current status of the network device, a current health of the network device, and/or the like. In either case, the collector device may not be able to effectively maintain and/or improve a performance of the network device.

Some implementations described herein provide a network device that sends absolute values of the telemetry data to a collector device based on a second time interval and delta values of the telemetry data (e.g., changes to the absolute values of the telemetry data) to the collector device based on a first time interval, wherein the first interval time is shorter than the second time interval. In this way, over a period of time that encompasses the second time interval and one or more iterations of the first time interval, the network device is able to send absolute values and delta values of the telemetry data to provide the same amount of information, but using less bandwidth, as would be used by the network device to send only absolute values of the telemetry data during the period of time. Further, because the size of delta values of the telemetry data is less than the absolute values of the telemetry data, the network device is able to more quickly send the delta values of the telemetry data at a particular time to the collector device than would be possible sending the absolute values of the telemetry data at the particular time. This allows the collector device to obtain timely and complete information, which enables the collector device to more accurately determine a status of the network device, a health of the network device, and/or the like. Additionally, this enables the network device to more quickly and/or more effectively maintain and/or improve a performance of the network device.

FIGS. 1A-1E are diagrams of an example 100 described herein. As shown in FIGS. 1A-1E, example 100 includes a network device and a collector device. The network device may include a switch, a router, a gateway, and/or the like. As shown in FIG. 1A, the network device may be included in a network (e.g., with one or more other network devices), such as a cellular network, a local area network (LAN), a core network, an access network, a wide area network (WAN) such as the Internet, a cloud network, and/or the like. The network device may support one or more service interfaces (e.g., one or more physical interfaces, one or more logical interfaces, and/or the like), one or more counters (e.g., associated with one or more processors of the network device, one or more memories of the network device, the one or more service interfaces of the network device, and/or the like), and/or the like, to facilitate routing packets through the network. The network device may be configured to generate telemetry data regarding the one or more service interfaces, the one or more counters, and/or the like, and provide information related to the telemetry data to the collector device, as further described herein.

The collector device may include a data structure (e.g., a storage device, such as a hard drive, a database, a network-attached storage (NAS), and/or the like, that is configured to store the information related to the telemetry data), a network analyzer or security appliance (e.g., a device capable of analyzing the information related to the telemetry data to perform traffic analysis, forensic analysis, threat analysis, and/or the like), a server device, another network device, and/or the like. The collector device may be configured to process and/or analyze the information related to the telemetry data; identify an issue or error associated with at least one of the one or more service interfaces, the one or more counters, and/or the like of the network device; and/or provide an instruction to perform a corrective action (e.g., to address the issue or error) to the network device, as further described herein. The collector device may be connected to the network device via one or more connections (e.g., via one or more direct connections, via one or more indirect connections, and/or the like).

Turning to FIG. 1A and reference number 105, the network device may receive a request for telemetry data from the collector device. For example, the collector device may generate and send the request for telemetry data to the network device via the one or more connections between the network device and the collector device. In some implementations, the network device may receive the request for the telemetry data after a predetermined quantity of time. For example, the collector device may send the request for the telemetry data after the network device has been connected to the network, after one or more settings of the network device have changed, and/or the like, for the predetermined quantity of time (e.g., after ten seconds, 30 seconds, one minute, ten minutes, and/or the like).

The telemetry data may be associated with the one or more service interfaces, the one or more counters, and/or the like, of the network device. For example, the telemetry data may concern a status, a performance, a count, and/or the like associated with the one or more service interfaces, the one or more counters, and/or the like, of the network device. As another example, the telemetry data may include data provided to the one or more service interfaces, data stored by the one or more counters, and/or the like, of the network device. In some implementations, the telemetry data indicates a problem associated with the network device (e.g., an error, an issue, a fault, and/or the like, associated with the one or more service interfaces, the one or more counters, and/or the like, of the network device).

In some implementations, as further described herein, the network device may send (e.g., based on the request) information related to the telemetry data to the collector device at particular times. For example, at a first particular time the network device may collect and send absolute values of the telemetry data (e.g., full values of the telemetry data collected at the first particular time) to the collector device, and at a second particular time (e.g., after the first particular time) the network device may send delta values of the telemetry data (e.g., differences in full values of the telemetry data collected at the second particular time and the full values of the telemetry data collected at the first particular time). In this way, by sending delta values of the telemetry data at the second particular time to the collector device, the network device may provide information related to the telemetry data to the collector device without needing to provide the absolute values of the telemetry data, which reduces bandwidth requirements for providing information related to the telemetry data to the collector device.

Figure 1B:
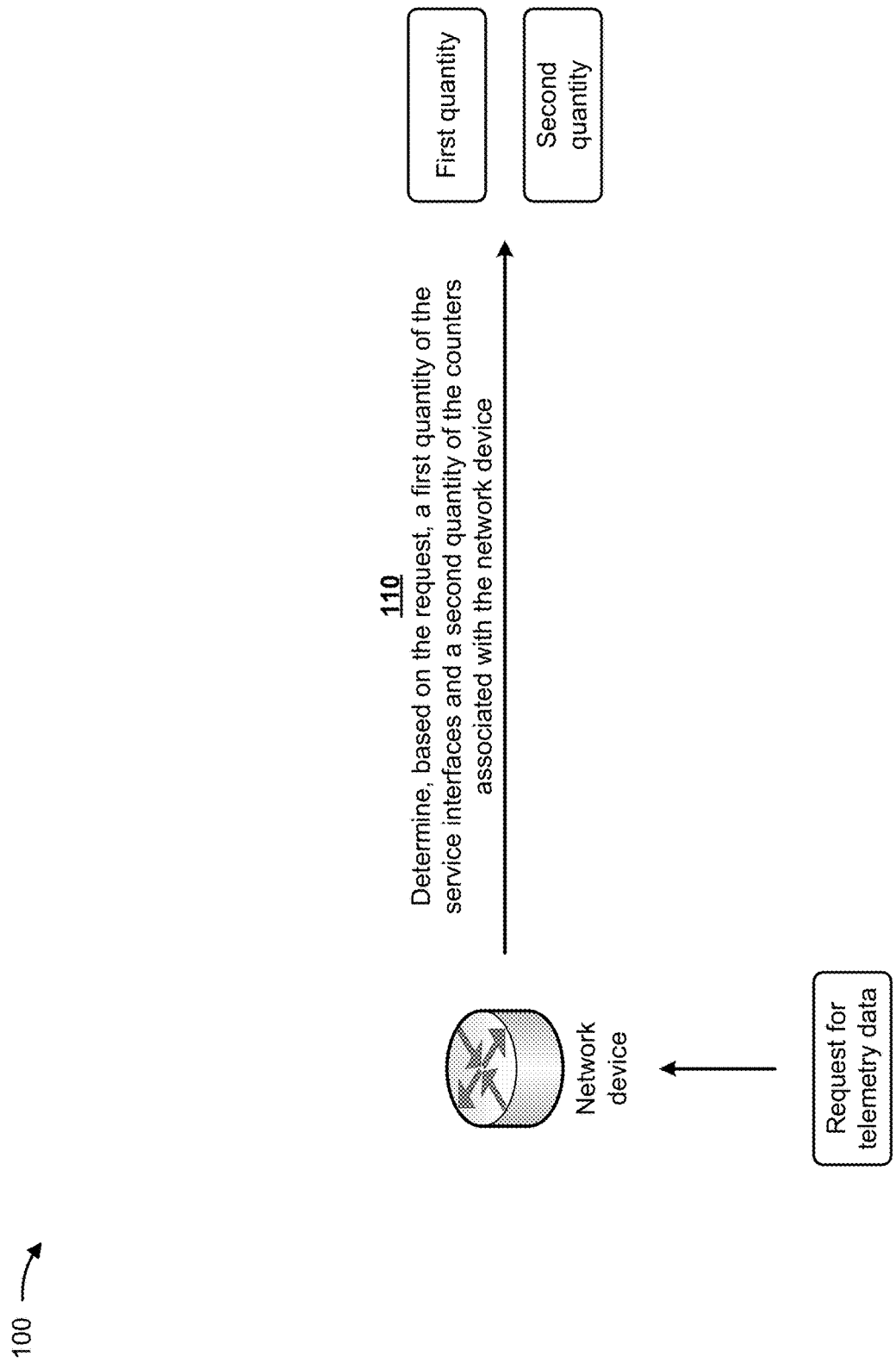

As shown in FIG. 1B, and by reference number 110, the network device may determine a quantity of the one or more service interfaces (referred to hereinafter as a "first quantity of the service interfaces"), a quantity of the one or more counters (referred to hereinafter as a "second quantity of the counters"), and/or the like, of the network device (e.g., based on the request for telemetry data). For example, the network device may perform a self-diagnostic process to identify active service interfaces, active counters, and/or the like of the network device to determine the first quantity of the service interfaces, the second quantity of the counters, and/or the like.

Figure 1C:
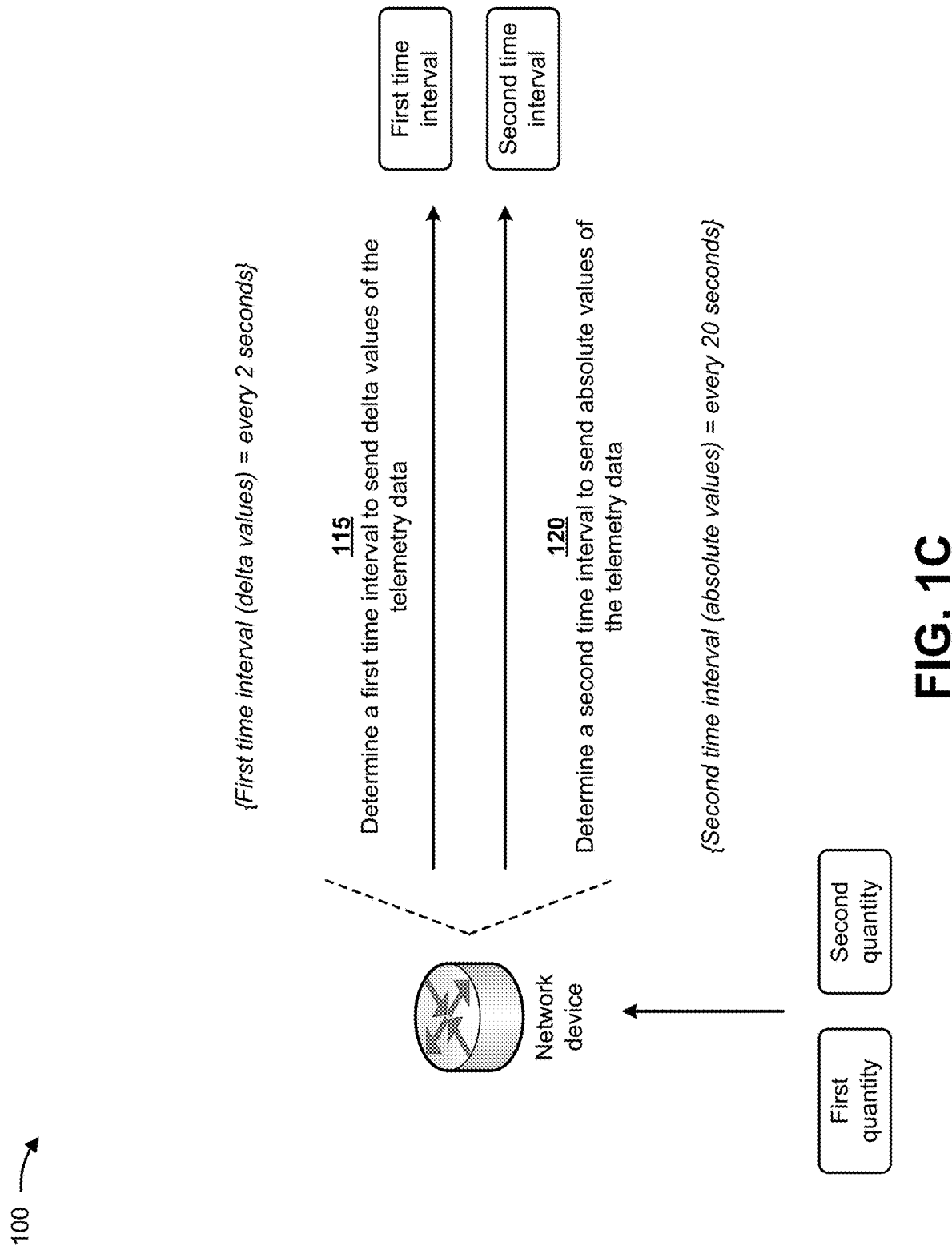

As shown in FIG. 1C, and by reference number 115, the network device may determine a first time interval (e.g., every 2 seconds, every 5 seconds, every 10 seconds, every 30 seconds, and/or the like) to collect and send the delta values of the telemetry data to the collector device. In some implementations, the network device may determine the first time interval based on a configured time interval for the network device. For example, the network device may cause the first time interval to be equal to the configured time interval, a multiplier (e.g., an integer multiplier) of the configured time interval, a portion (e.g., associated with an integer divisor) of the configured time interval, and/or the like. The configured time interval may be preconfigured in the network device (e.g., as part of firmware included in the network device), may be received from the collector device or another device (e.g., another network device), and/or the like.

As further shown in FIG. 1C, and by reference number 120, the network device may determine a second time interval (e.g., every 10 seconds, every 20 seconds, every minute, every 5 minutes, and/or the like) to collect and send the absolute values of the telemetry data to the collector device. In some implementations, the network device may determine the second time interval based on the first time interval, the first quantity of the service interfaces, the second quantity of the counters, and/or the like. For example, the network device may cause the second time interval to be equal to a multiplier (e.g., an integer multiplier) of the first time interval (e.g., such that the second time interval is greater than the first time interval). The network device may determine the multiplier based on the first quantity of the service interfaces, the second quantity of counters, and/or the like. The multiplier may have a positive relationship with the first quantity of the service interfaces, the second quantity of counters, and/or the like. For example, as a sum of the first quantity of the service interfaces, the second quantity of counters, and/or the like, increases, a value of the multiplier increases.

In one example, as further shown in FIG. 1C, the network device may determine the first time interval to be 2 seconds and the second time interval to be 20 seconds, where the second time interval is a multiplier (e.g., equal to 10) of the first time interval.

Figure 1D:
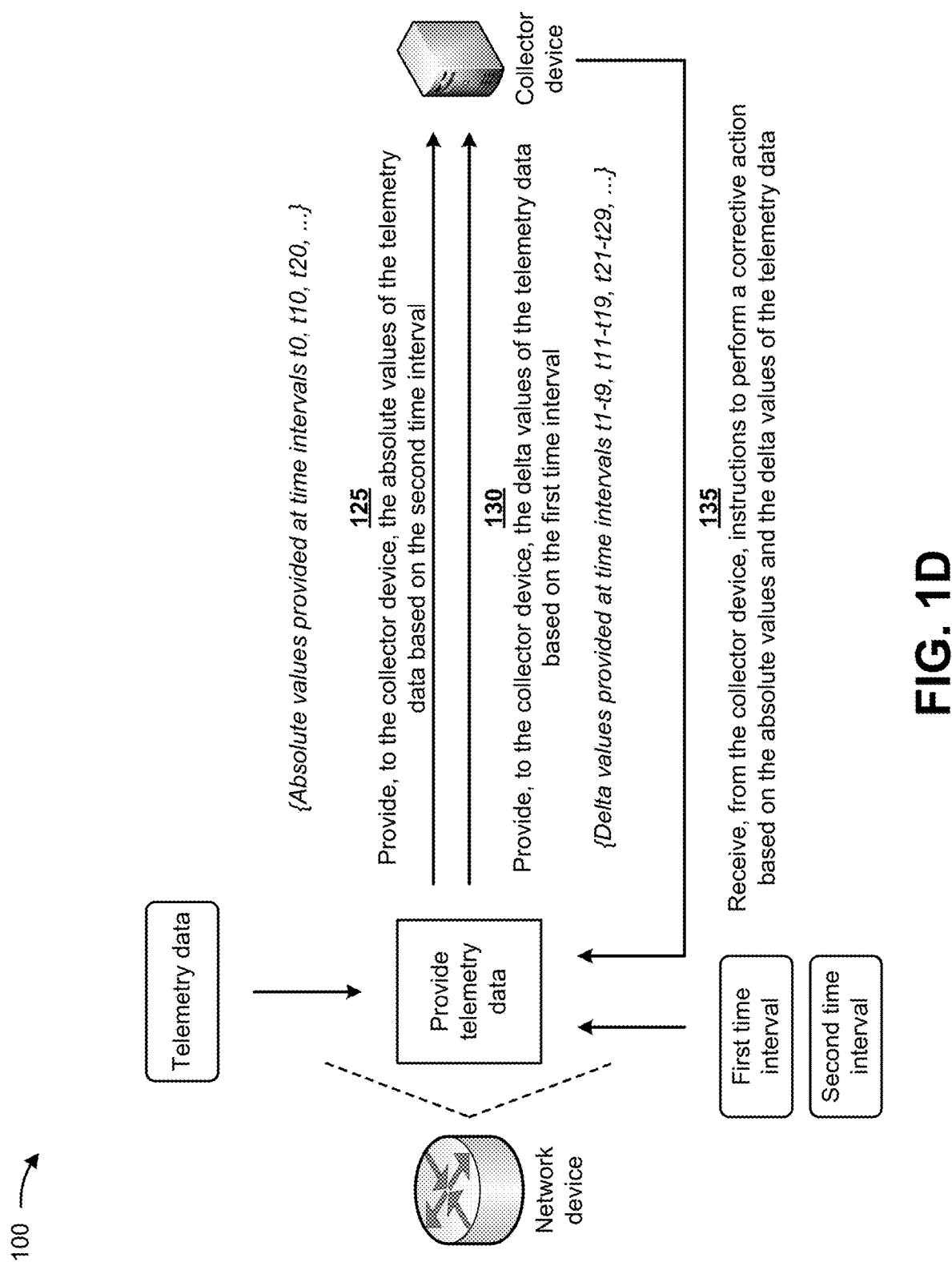

As shown in FIG. 1D, and by reference number 125, the network device may provide the absolute values of the telemetry data to the collector device based on the second time interval (e.g., at the start of each second time interval, at the end of each second time interval, or the like). For example, the network device may send the absolute values of the telemetry data to the collector device via the one or more connections between the network device and the collector device and/or using a user datagram protocol (UDP). In some implementations, the network device may compress the absolute values of the telemetry data prior to providing the absolute values of the telemetry data to the collector device. For example, the network device may compress the absolute values of the telemetry data using a serialization technique (e.g., the network device may compress the absolute values of the telemetry data using Google protocol buffer (GPB), Apache Thrift, JavaScript Object Notation (JSON), and/or the like).

As further shown in FIG. 1D, and by reference number 130, the network device may provide the delta values of the telemetry data to the collector device based on the first time interval (e.g., at the start of each first time interval, at the end of each first time interval, or the like). For example, the network device may send the delta values of the telemetry data to the collector device via the one or more connections between the network device and the collector device and/or using UDP. In some implementations, the network device may compress the delta values of the telemetry data prior to providing the delta values of the telemetry data to the collector device. For example, the network device may compress the delta values of the telemetry data using the serialization technique (e.g., the network device may compress the delta values of the telemetry data using GPB, Apache Thrift, JSON, and/or the like).

In an example, as further shown in FIG. 1D, the network device may provide the absolute values of the telemetry data to the collector device at time t0 and provide the delta values of the telemetry data to the collector device at times t1-t9 (e.g., where the delta values of the telemetry data at times t1-t9 are relative to the absolute values of the telemetry data at time t0), may provide the absolute values of the telemetry data to the collector device at time t10 and provide the delta values of the telemetry data to the collector device at times t11-t19 (e.g., where the delta values of the telemetry data at times t11-t19 are relative to the absolute values of the telemetry data at time t10), may provide the absolute values of the telemetry data to the collector device at time t20 and provide the delta values of the telemetry data to the collector device at times t21-t29 (e.g., where the delta values of the telemetry data at times t21-t29 are relative to the absolute values of the telemetry data at time t20), and so on.

In some implementations, the collector device may process and/or analyze the absolute values of the telemetry data and/or the delta values of the telemetry data received from the network device. For example, the collector device may process and/or analyze the absolute values of the telemetry data and/or the delta values of the telemetry data to determine a status of the network device, a health of the network device, and/or the like. In some implementations, the collector device may identify a problem associated with the network device (e.g., a problem associated with the one or more service interfaces, the one or more counters, and/or the like of the network device) based on processing and/or analyzing the absolute values of the telemetry data and/or the delta values of the telemetry data. In some implementations, the collector device may generate one or more instructions (e.g., one or more commands, computer code, and/or the like) to perform a corrective action to address the problem (e.g., one or more instructions to be executed by the network device to cause the network device to perform the corrective action to address the problem). The corrective action may include resetting the network device, adjusting one or more settings of the network device, reallocating resources of the network device, and/or the like.

As further shown in FIG. 1D, and by reference number 135, the network device may receive the one or more instructions from the collector device. For example, the collector device may send the one or more instructions to the network device via the one or more connections between the network device and the collector device. In some implementations, the network device may process (e.g., execute) the one or more instructions to perform the corrective action.

Figure 1E:
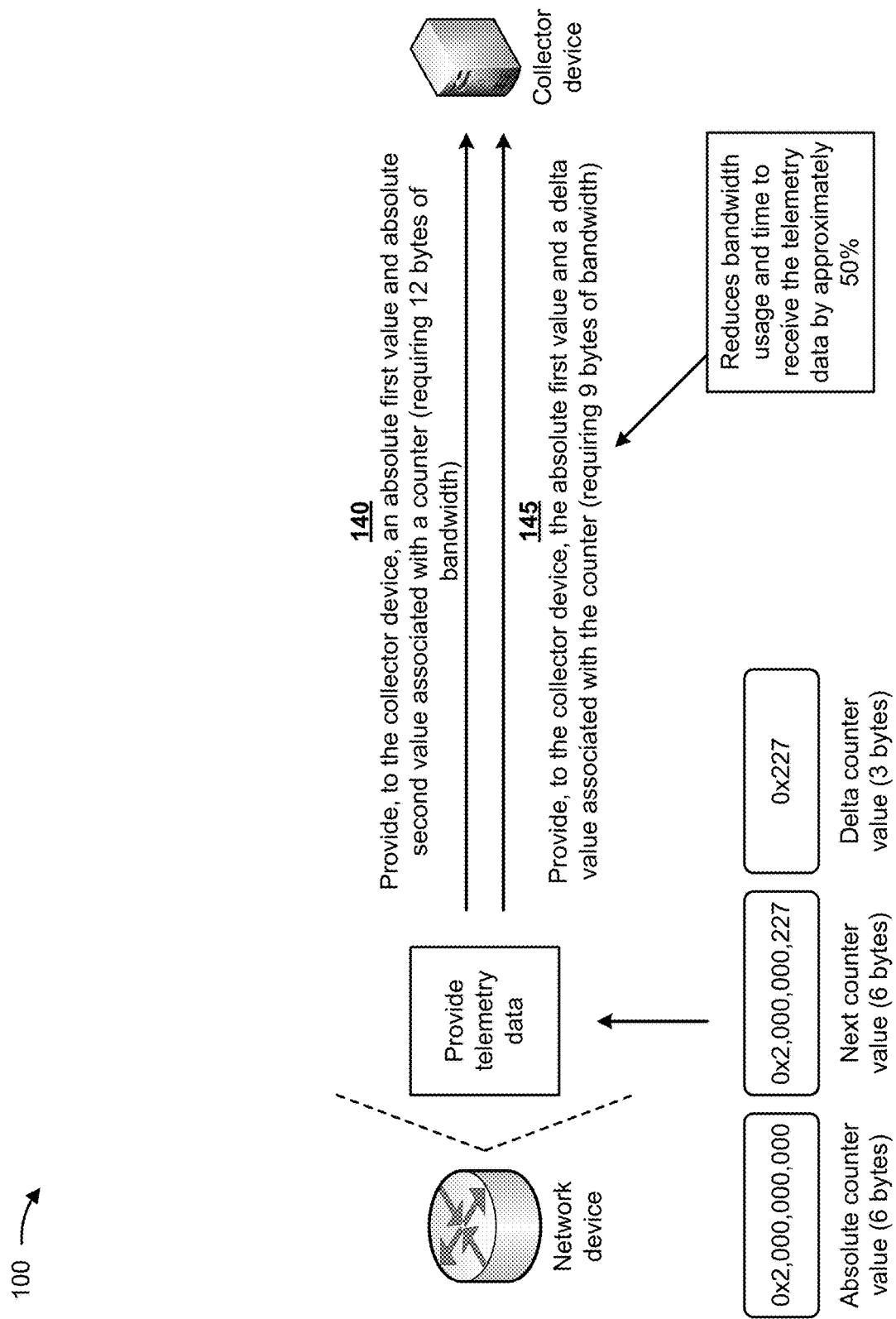

FIG. 1E illustrates an example demonstrating how providing the absolute values of the telemetry data based on the second time interval and providing the delta values of the telemetry data based on the first time interval reduces bandwidth requirements relative to providing the telemetry based on a single time interval. As shown in FIG. 1E and by reference number 140, in a conventional approach for sending telemetry data to the collector device, the network device may provide an absolute first value, shown as 0x2,000,000,000, associated with a counter at a first time and an absolute second value, shown as 0x2,000,000,227, associated with the counter at a second time. In this example, the absolute first value is represented in 6 bytes (e.g., based on using the serialization technique described above) and the absolute second value is represented in 6 bytes (e.g., based on using the serialization technique described above), so sending the absolute first value and the absolute second values requires 12 bytes of bandwidth.

As further shown in FIG. 1E, and by reference number 145, in an approach associated with one or more implementations described herein, the network device may send the absolute first value associated with the counter at the first time and a delta value, shown as 0x227 (e.g., the absolute first value, 0x2,000,000,000, subtracted from the absolute second value, 0x2,000,000,227), associated with the counter at the second time. In this example, the absolute first value is represented in 6 bytes and the delta value is represented in 3 bytes (e.g., based on using the serialization technique described above), so sending the absolute first value and the delta value requires 9 bytes of bandwidth, which reduces an amount of bandwidth that is necessary to send the same amount of information to the collector device. As further shown in FIG. 1E, sending the delta value, as opposed to sending the absolute value, at any time reduces bandwidth usage, as well as time, for the collector device to receive information related to the telemetry data by approximately 50%.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
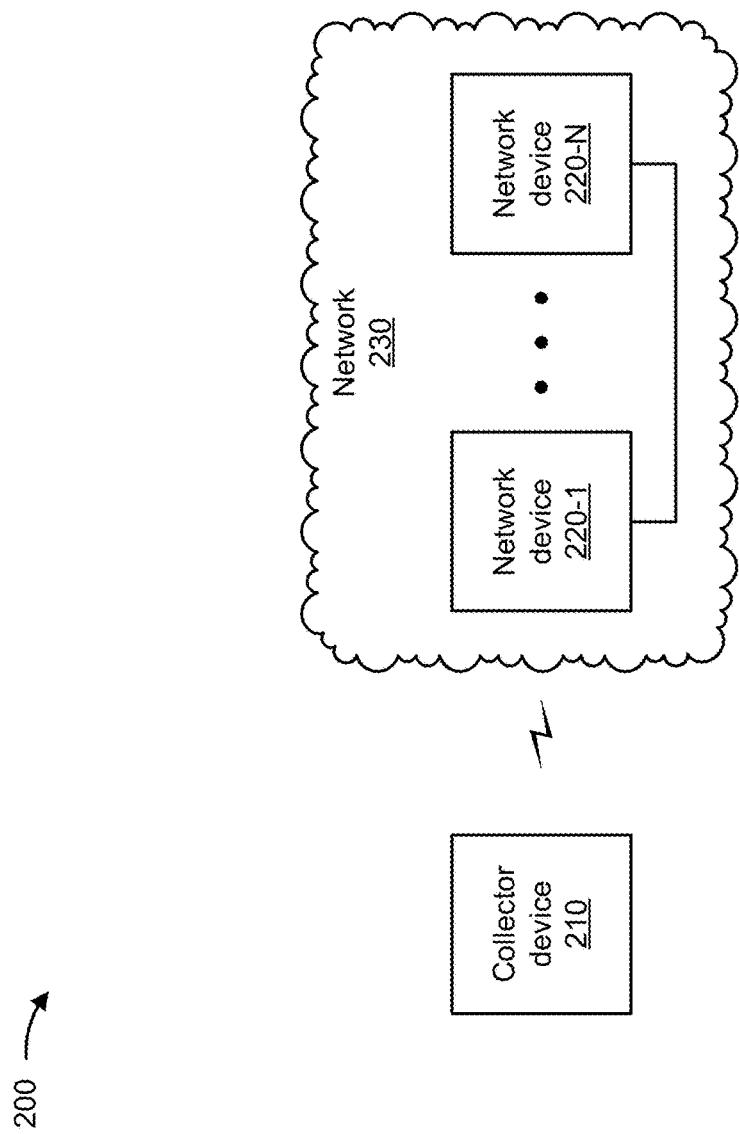
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a collector device 210, a group of network devices 220 (shown as network device 220-1 through network device 220-N), and a network 230. Devices of environment 200 may interconnect via wired connections, wireless connections, or a combination of wired and wireless connections.

Collector device 210 includes one or more devices capable of receiving, generating, storing, processing, and/or providing information, such as information described herein. For example, collector device 210 may include a storage device, a network analyzer device, a security appliance, a data center, a server device, a cloud platform, another network device, and/or the like. In some implementations, collector device 210 may include a laptop computer, a tablet computer, a desktop computer, or a similar type of device. In some implementations, collector device 210 may receive delta values of telemetry data associated with a network device 220 and/or absolute values of the telemetry data from the network device 220. In some implementations, collector device 210 may send one or more instructions to the network device 220 to cause the network device to perform one or more corrective actions.

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. In some implementations, network device 220 may include a gateway, a switch, a firewall, a hub, a bridge, a reverse proxy, a server (e.g., a proxy server, a cloud server, a data center server, and/or the like), a load balancer, and/or a similar device. Additionally, or alternatively, network device may include a laptop computer, a tablet computer, a desktop computer, an Internet of Things (IoT) device, or a similar type of device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. In some implementations, network device 220 may send delta values of telemetry data associated with the network device 220 and/or absolute values of the telemetry data to collector device 210. In some implementations, network device 220 may receive one or more instructions from the collector device 210 and perform the one or more corrective actions based on the one or more instructions.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
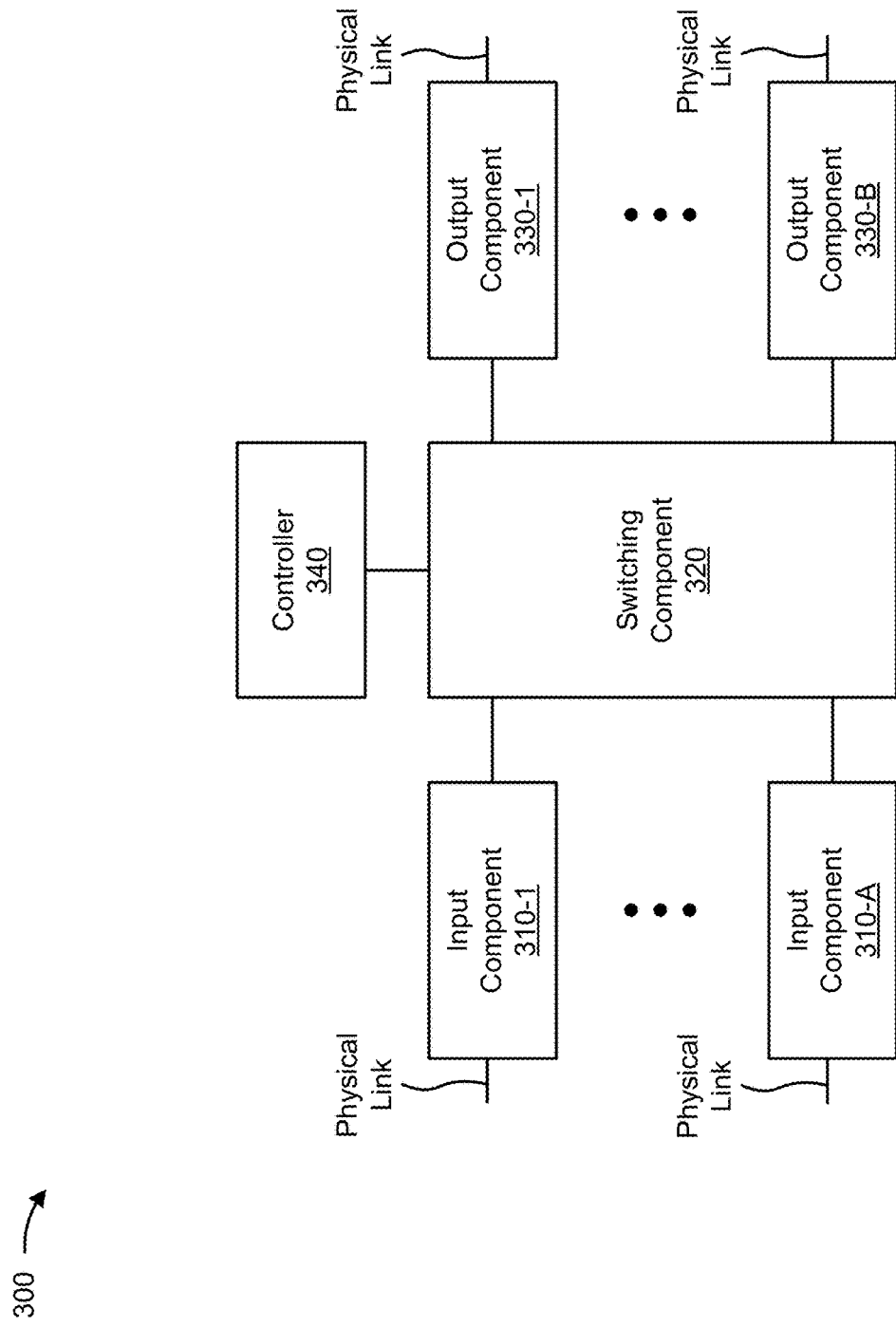
FIGS. 3-4 are diagrams of example components of one or more devices of FIG. 2.

FIG. 3 is a diagram of example components of a device 300, which may correspond to collector device 210 and/or network device 220. In some implementations, collector device 210 and/or network device 220 may include one or more devices 300 and/or one or more components of device 300. As shown in FIG. 3, device 300 may include one or more input components 310-1 through 310-A (A≥1) (hereinafter referred to collectively as input components 310, and individually as input component 310), a switching component 320, one or more output components 330-1 through 330-B (B≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
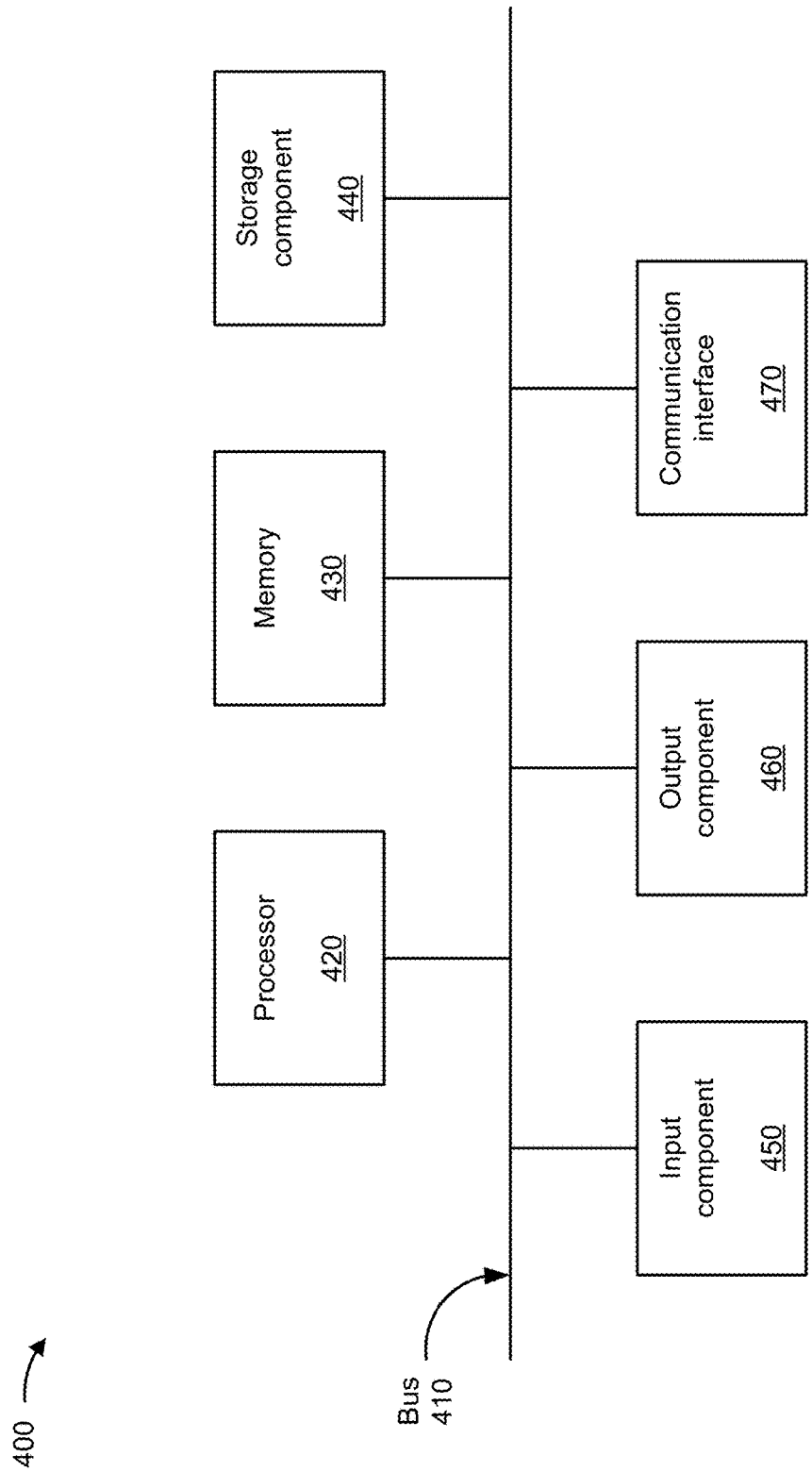

FIG. 4 is a diagram of example components of a device 400, which may correspond to collector device 210 and/or network device 220. In some implementations, collector device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication interface 470 enables device 400 to communicate with other devices, such as via a wired connection and/or a wireless connection. For example, communication interface 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
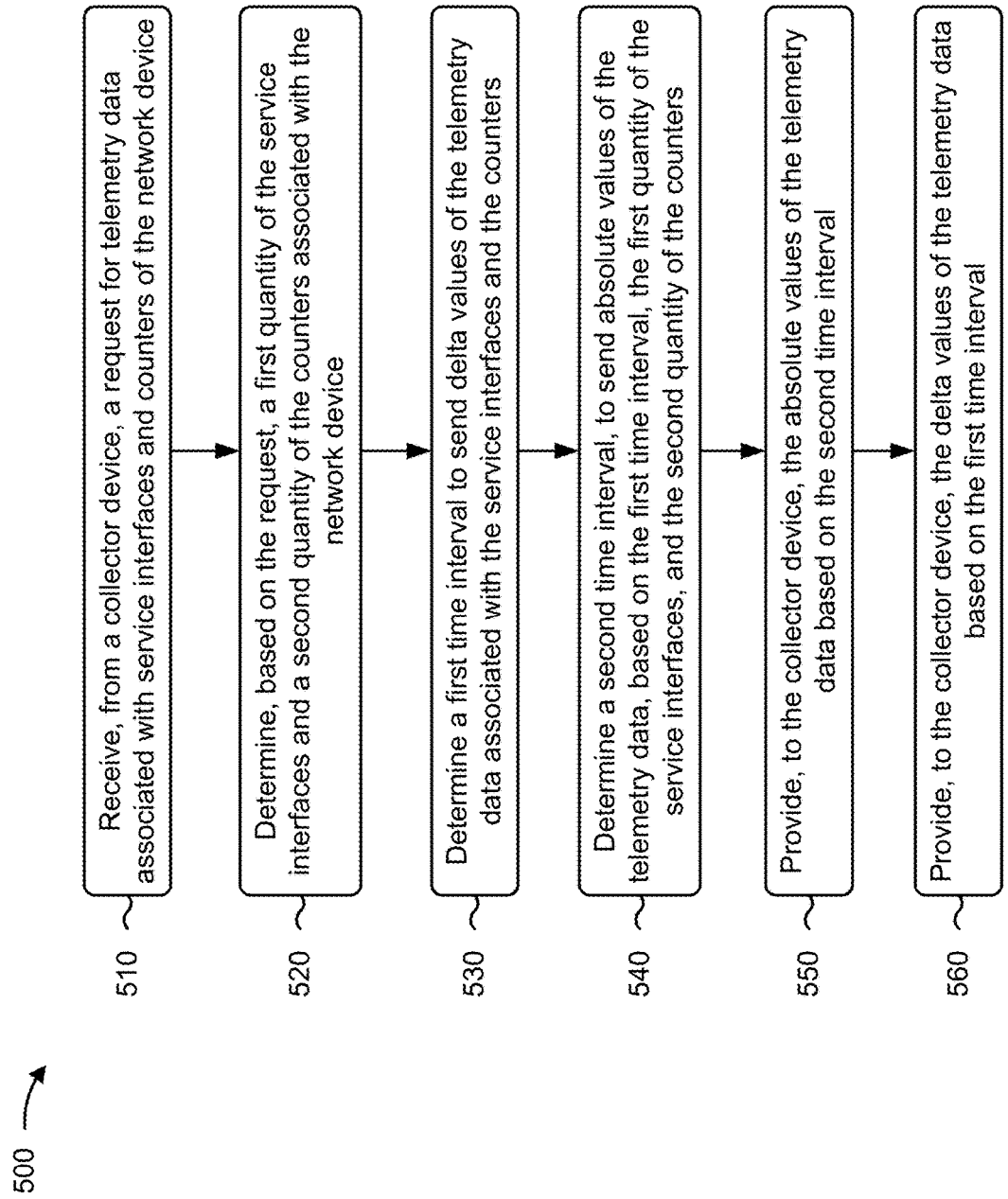
FIGS. 5-7 are flowcharts of example processes relating to optimizing bandwidth utilization when exporting telemetry data from a network device.

FIG. 5 is a flowchart of an example process 500 associated with optimizing bandwidth utilization when exporting telemetry data from a network device. In some implementations, one or more process blocks of FIG. 5 may be performed by a network device (e.g., network device 220). In some implementations, one or more process blocks of FIG. 5 may be performed by another device or a group of devices separate from or including the network device, such as A collector device (e.g., collector device 210). Additionally, or alternatively, one or more process blocks of FIG. 5 may be performed by one or more components of device 300, such as input component 310, switching component 320, output component 330, and/or controller 340; one or more components of device 400, such as processor 420, memory 430, storage component 440, input component 450, output component 460, and/or communication interface 470; and/or the like.

As shown in FIG. 5, process 500 may include receiving, from a collector device, a request for telemetry data associated with service interfaces and counters of the network device (block 510). For example, the network device may receive, from a collector device, a request for telemetry data associated with service interfaces and counters of the network device, as described above.

As further shown in FIG. 5, process 500 may include determining, based on the request, a first quantity of the service interfaces and a second quantity of the counters associated with the network device (block 520). For example, the network device may determine, based on the request, a first quantity of the service interfaces and a second quantity of the counters associated with the network device, as described above.

As further shown in FIG. 5, process 500 may include determining a first time interval to send delta values of the telemetry data associated with the service interfaces and the counters (block 530). For example, the network device may determine a first time interval to send delta values of the telemetry data associated with the service interfaces and the counters, as described above.

As further shown in FIG. 5, process 500 may include determining a second time interval, to send absolute values of the telemetry data, based on the first time interval, the first quantity of the service interfaces, and the second quantity of the counters (block 540). For example, the network device may determine a second time interval, to send absolute values of the telemetry data, based on the first time interval, the first quantity of the service interfaces, and the second quantity of the counters, as described above.

As further shown in FIG. 5, process 500 may include providing, to the collector device, the absolute values of the telemetry data based on the second time interval (block 550). For example, the network device may provide, to the collector device, the absolute values of the telemetry data based on the second time interval, as described above.

As further shown in FIG. 5, process 500 may include providing, to the collector device, the delta values of the telemetry data based on the first time interval (block 560). For example, the network device may provide, to the collector device, the delta values of the telemetry data based on the first time interval, as described above.

Process 500 may include additional implementations, such as any single implementation or any combination of implementations described below and/or in connection with one or more other processes described elsewhere herein.

In a first implementation, process 500 includes receiving, from the collector device, an instruction to perform a corrective action based on the absolute values of the telemetry data and the delta values of the telemetry data, and performing the corrective action based on the instruction.

In a second implementation, alone or in combination with the first implementation, process 500 includes compressing the absolute values of the telemetry data, with a serialization technique, prior to providing the absolute values of the telemetry data to the collector device, and compressing the delta values of the telemetry data, with the serialization technique, prior to providing the delta values of the telemetry data to the collector device.

In a third implementation, alone or in combination with one or more of the first and second implementations, providing, to the collector device, the absolute values of the telemetry data based on the second time interval comprises providing, to the collector device, the absolute values of the telemetry data based on the second time interval and via a user datagram protocol, and providing, to the collector device, the delta values of the telemetry data based on the first time interval comprises providing, to the collector device, the delta values of the telemetry data based on the first time interval and via the user datagram protocol.

In a fourth implementation, alone or in combination with one or more of the first through third implementations, determining the first time interval to send the delta values of the telemetry data associated with the service interfaces and the counters comprises determining the first time interval to send the delta values of the telemetry data based on a configured time interval for the network device.

In a fifth implementation, alone or in combination with one or more of the first through fourth implementations, the second time interval is a multiplier of the first time interval.

In a sixth implementation, alone or in combination with one or more of the first through fifth implementations, values of particular delta values in a particular first time interval are relative to a previous absolute value in a particular second time interval prior to the particular first time interval.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
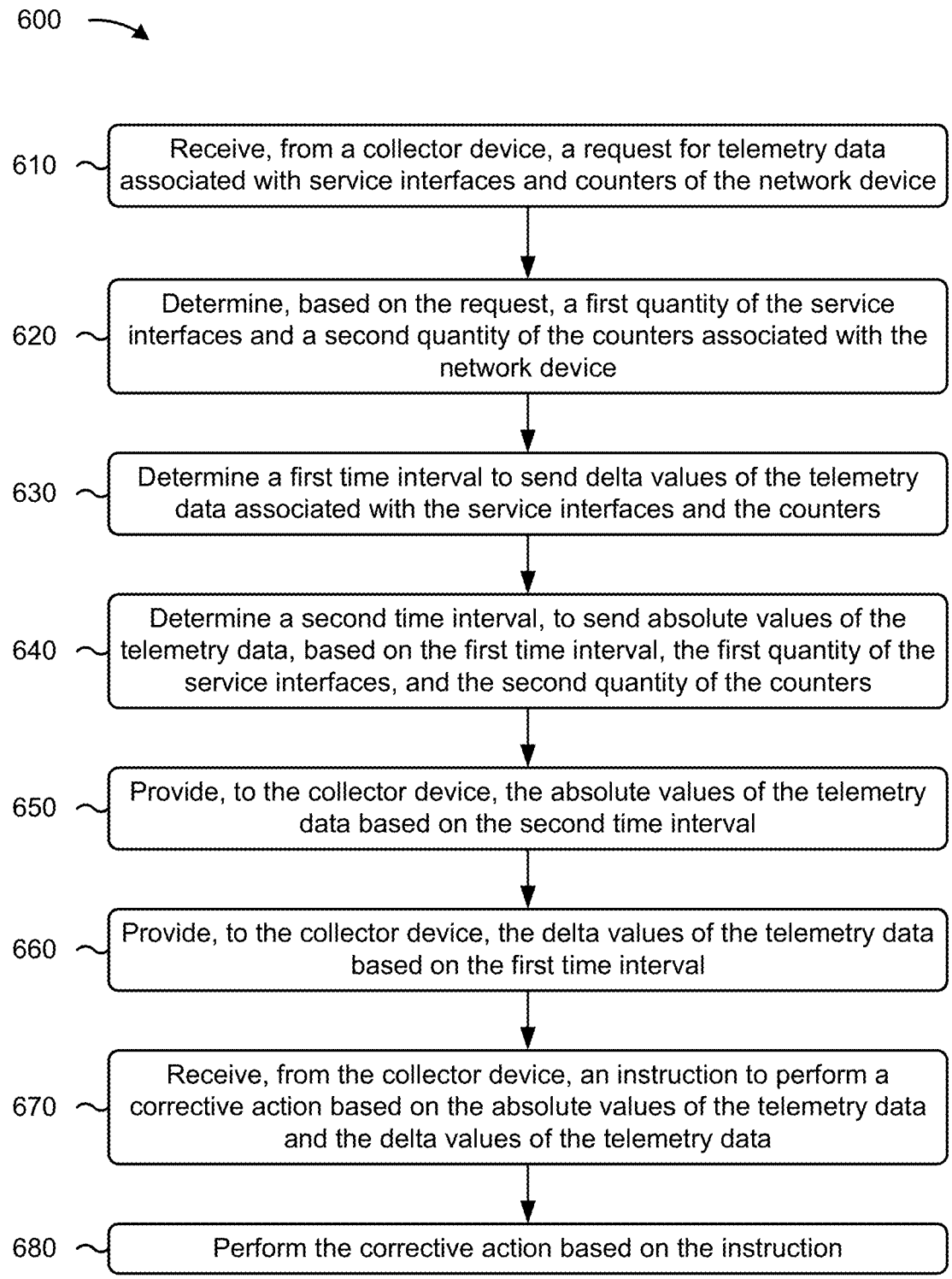

FIG. 6 is a flowchart of an example process 600 associated with optimizing bandwidth utilization when exporting telemetry data from a network device. In some implementations, one or more process blocks of FIG. 6 may be performed by a network device (e.g., network device 220). In some implementations, one or more process blocks of FIG. 6 may be performed by another device or a group of devices separate from or including the network device, such as A collector device (e.g., collector device 210). Additionally, or alternatively, one or more process blocks of FIG. 6 may be performed by one or more components of device 300, such as input component 310, switching component 320, output component 330, and/or controller 340; one or more components of device 400, such as processor 420, memory 430, storage component 440, input component 450, output component 460, and/or communication interface 470; and/or the like.

As shown in FIG. 6, process 600 may include receiving, from a collector device, a request for telemetry data associated with service interfaces and counters of the network device (block 610). For example, the network device may receive, from a collector device, a request for telemetry data associated with service interfaces and counters of the network device, as described above.

As further shown in FIG. 6, process 600 may include determining, based on the request, a first quantity of the service interfaces and a second quantity of the counters associated with the network device (block 620). For example, the network device may determine, based on the request, a first quantity of the service interfaces and a second quantity of the counters associated with the network device, as described above.

As further shown in FIG. 6, process 600 may include determining a first time interval to send delta values of the telemetry data associated with the service interfaces and the counters (block 630). For example, the network device may determine a first time interval to send delta values of the telemetry data associated with the service interfaces and the counters, as described above.

As further shown in FIG. 6, process 600 may include determining a second time interval, to send absolute values of the telemetry data, based on the first time interval, the first quantity of the service interfaces, and the second quantity of the counters (block 640). For example, the network device may determine a second time interval, to send absolute values of the telemetry data, based on the first time interval, the first quantity of the service interfaces, and the second quantity of the counters, as described above.

As further shown in FIG. 6, process 600 may include providing, to the collector device, the absolute values of the telemetry data based on the second time interval (block 650). For example, the network device may provide, to the collector device, the absolute values of the telemetry data based on the second time interval, as described above.

As further shown in FIG. 6, process 600 may include providing, to the collector device, the delta values of the telemetry data based on the first time interval (block 660). For example, the network device may provide, to the collector device, the delta values of the telemetry data based on the first time interval, as described above.

As further shown in FIG. 6, process 600 may include receiving, from the collector device, an instruction to perform a corrective action based on the absolute values of the telemetry data and the delta values of the telemetry data (block 670). For example, the network device may receive, from the collector device, an instruction to perform a corrective action based on the absolute values of the telemetry data and the delta values of the telemetry data, as described above.

As further shown in FIG. 6, process 600 may include performing the corrective action based on the instruction (block 680). For example, the network device may perform the corrective action based on the instruction, as described above.

Process 600 may include additional implementations, such as any single implementation or any combination of implementations described below and/or in connection with one or more other processes described elsewhere herein.

In a first implementation, providing the absolute values of the telemetry data based on the second time interval and providing the delta values of the telemetry data based on the first time interval reduces bandwidth requirements relative to providing the telemetry based on a single time interval.

In a second implementation, alone or in combination with the first implementation, receiving, from the collector device, the request for the telemetry data associated with the service interfaces and the counters of the network device includes receiving, from the collector device, the request for the telemetry data after a predetermined quantity of time.

In a third implementation, alone or in combination with one or more of the first and second implementations, the first time interval includes a configured time interval for the network device, and the second time interval is greater than the first time interval.

In a fourth implementation, alone or in combination with one or more of the first through third implementations, the telemetry data includes one or more of data provided to the service interfaces of the network device, or data stored by the counters of the network device.

In a fifth implementation, alone or in combination with one or more of the first through fourth implementations, values of particular delta values in a particular first time interval are relative to a previous absolute value in a particular second time interval prior to the particular first time interval.

In a sixth implementation, alone or in combination with one or more of the first through fifth implementations, the second time interval is an integer multiplier of the first time interval.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
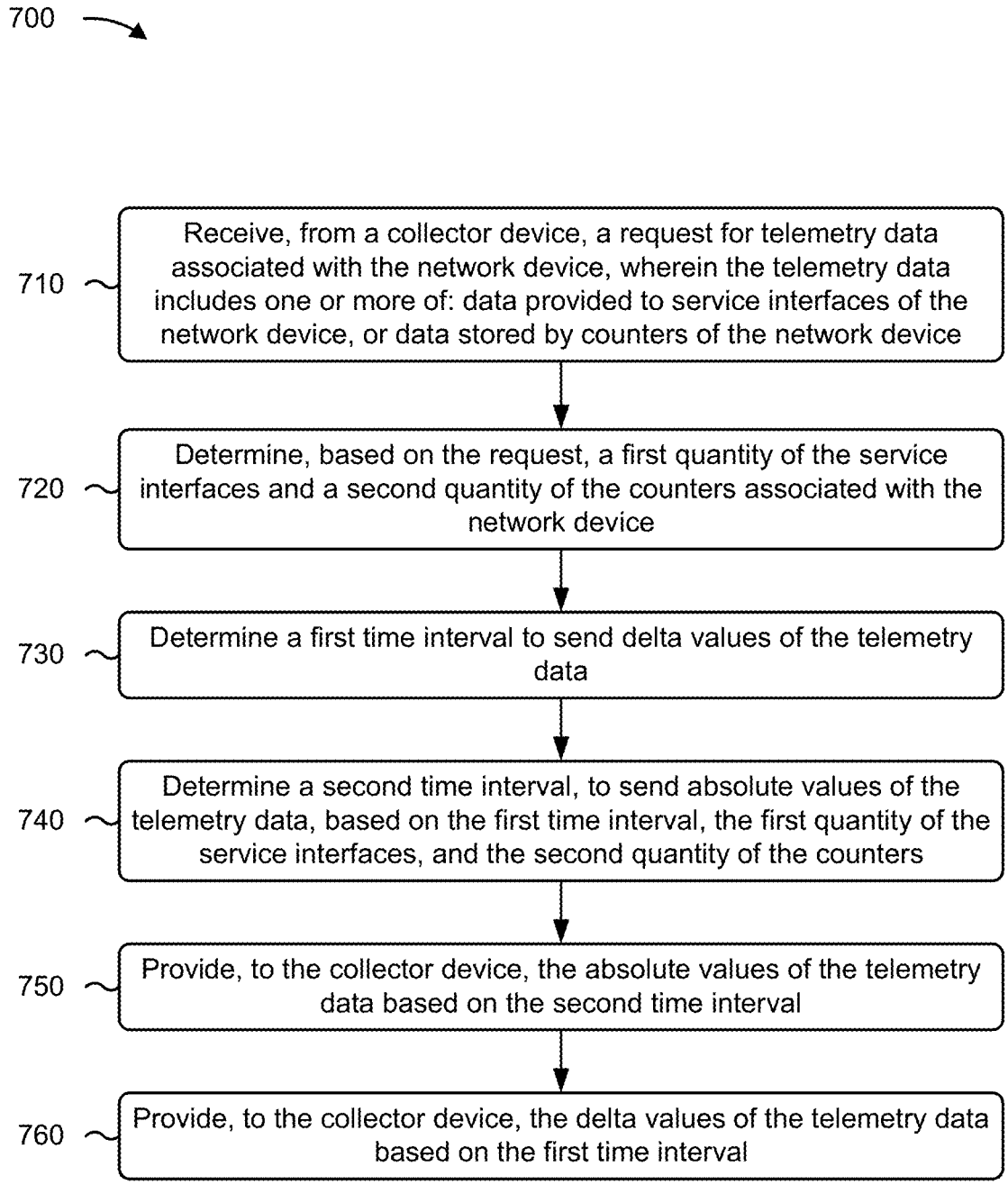

FIG. 7 is a flowchart of an example process 700 associated with optimizing bandwidth utilization when exporting telemetry data from a network device. In some implementations, one or more process blocks of FIG. 7 may be performed by a network device (e.g., network device 220). In some implementations, one or more process blocks of FIG. 7 may be performed by another device or a group of devices separate from or including the network device, such as A collector device (e.g., collector device 210). Additionally, or alternatively, one or more process blocks of FIG. 7 may be performed by one or more components of device 300, such as input component 310, switching component 320, output component 330, and/or controller 340; one or more components of device 400, such as processor 420, memory 430, storage component 440, input component 450, output component 460, and/or communication interface 470; and/or the like.

As shown in FIG. 7, process 700 may include receiving, from a collector device, a request for telemetry data associated with the network device, wherein the telemetry data includes one or more of data provided to service interfaces of the network device or data stored by counters of the network device (block 710). For example, the network device may receive, from a collector device, a request for telemetry data associated with the network device, as described above. In some implementations, the telemetry data includes one or more of data provided to service interfaces of the network device or data stored by counters of the network device.

As further shown in FIG. 7, process 700 may include determining, based on the request, a first quantity of the service interfaces and a second quantity of the counters associated with the network device (block 720). For example, the network device may determine, based on the request, a first quantity of the service interfaces and a second quantity of the counters associated with the network device, as described above.

As further shown in FIG. 7, process 700 may include determining a first time interval to send delta values of the telemetry data (block 730). For example, the network device may determine a first time interval to send delta values of the telemetry data, as described above.

As further shown in FIG. 7, process 700 may include determining a second time interval, to send absolute values of the telemetry data, based on the first time interval, the first quantity of the service interfaces, and the second quantity of the counters (block 740). For example, the network device may determine a second time interval, to send absolute values of the telemetry data, based on the first time interval, the first quantity of the service interfaces, and the second quantity of the counters, as described above.

As further shown in FIG. 7, process 700 may include providing, to the collector device, the absolute values of the telemetry data based on the second time interval (block 750). For example, the network device may provide, to the collector device, the absolute values of the telemetry data based on the second time interval, as described above.

As further shown in FIG. 7, process 700 may include providing, to the collector device, the delta values of the telemetry data based on the first time interval (block 760). For example, the network device may provide, to the collector device, the delta values of the telemetry data based on the first time interval, as described above.

Process 700 may include additional implementations, such as any single implementation or any combination of implementations described below and/or in connection with one or more other processes described elsewhere herein.

In a first implementation, process 700 includes receiving, from the collector device, an instruction to perform a corrective action based on the absolute values of the telemetry data and the delta values of the telemetry data, and performing the corrective action based on the instruction.

In a second implementation, alone or in combination with the first implementation, process 700 includes compressing the absolute values of the telemetry data, with a serialization technique, prior to providing the absolute values of the telemetry data to the collector device, and compressing the delta values of the telemetry data, with the serialization technique, prior to providing the delta values of the telemetry data to the collector device.

In a third implementation, alone or in combination with one or more of the first and second implementations, causing the network device to determine the first time interval to send the delta values of the telemetry data includes determining the first time interval to send the delta values of the telemetry data based on a configured time interval for the network device.

In a fourth implementation, alone or in combination with one or more of the first through third implementations, the first time interval includes a configured time interval for the network device, and the second time interval is greater than the first time interval.

In a fifth implementation, alone or in combination with one or more of the first through fourth implementations, the telemetry data indicates a problem associated with the network device and process 700 includes receiving, from the collector device, an instruction to perform a corrective action for the problem associated with the network device, and performing the corrective action based on the instruction.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a network device and from a collector device, a request for telemetry data associated with service interfaces and counters of the network device;
determining, by the network device and based on the request, a first quantity of the service interfaces and a second quantity of the counters associated with the network device;
determining, by the network device, a first time interval to send delta values of the telemetry data associated with the service interfaces and the counters;
determining, by the network device, a second time interval, to send absolute values of the telemetry data, based on the first time interval, the first quantity of the service interfaces, and the second quantity of the counters;
compressing, by the network device, the absolute values of the telemetry data, with a serialization technique, prior to providing the absolute values of the telemetry data to the collector device;
providing, by the network device and to the collector device, the absolute values of the telemetry data based on the second time interval;
compressing, by the network device, the delta values of the telemetry data, with the serialization technique, prior to providing the delta values of the telemetry data to the collector device; and
providing, by the network device and to the collector device, the delta values of the telemetry data based on the first time interval.

2. The method of claim 1, further comprising:
receiving, from the collector device, an instruction to perform a corrective action based on the absolute values of the telemetry data and the delta values of the telemetry data; and
performing the corrective action based on the instruction.

3. The method of claim 1, wherein:
providing, to the collector device, the absolute values of the telemetry data based on the second time interval comprises:
providing, to the collector device, the absolute values of the telemetry data based on the second time interval and via a user datagram protocol, and
wherein providing, to the collector device, the delta values of the telemetry data based on the first time interval comprises:
providing, to the collector device, the delta values of the telemetry data based on the first time interval and via the user datagram protocol.

4. The method of claim 1, wherein determining the first time interval to send the delta values of the telemetry data associated with the service interfaces and the counters comprises:
determining the first time interval to send the delta values of the telemetry data based on a configured time interval for the network device.

5. The method of claim 1, wherein the second time interval is a multiplier of the first time interval.

6. The method of claim 1, wherein values of particular delta values in a particular first time interval are relative to a previous absolute value in a particular second time interval prior to the particular first time interval.

7. A network device, comprising:
one or more memories; and
one or more processors to:
receive, from a collector device, a request for telemetry data associated with service interfaces and counters of the network device;
determine, based on the request, a first quantity of the service interfaces and a second quantity of the counters associated with the network device;
determine a first time interval to send delta values of the telemetry data associated with the service interfaces and the counters;
determine a second time interval, to send absolute values of the telemetry data, based on the first time interval, the first quantity of the service interfaces, and the second quantity of the counters;
compress the absolute values of the telemetry data, with a serialization technique, prior to providing the absolute values of the telemetry data to the collector device;
provide, to the collector device, the absolute values of the telemetry data based on the second time interval;
compress the delta values of the telemetry data, with the serialization technique, prior to providing the delta values of the telemetry data to the collector device;
provide, to the collector device, the delta values of the telemetry data based on the first time interval;
receive, from the collector device, an instruction to perform a corrective action based on the absolute values of the telemetry data and the delta values of the telemetry data; and
perform the corrective action based on the instruction.

8. The network device of claim 7, wherein providing the absolute values of the telemetry data based on the second time interval, and providing the delta values of the telemetry data based on the first time interval reduces bandwidth requirements relative to providing the telemetry based on a single time interval.

9. The network device of claim 7, wherein the one or more processors, when receiving, from the collector device, the request for the telemetry data associated with the service interfaces and the counters of the network device, are to:
receive, from the collector device, the request for the telemetry data after a predetermined quantity of time.

10. The network device of claim 7, wherein the first time interval includes a configured time interval for the network device, and
wherein the second time interval is greater than the first time interval.

11. The network device of claim 7, wherein the telemetry data includes one or more of:
data provided to the service interfaces of the network device, or
data stored by the counters of the network device.

12. The network device of claim 7, wherein values of particular delta values in a particular first time interval are relative to a previous absolute value in a particular second time interval prior to the particular first time interval.

13. The network device of claim 7, wherein the second time interval is an integer multiplier of the first time interval.

14. A non-transitory computer-readable medium storing a set of instructions, the set of instructions comprising:
one or more instructions that, when executed by one or more processors of a network device, cause the network device to:
receive, from a collector device, a request for telemetry data associated with the network device,
wherein the telemetry data includes one or more of:
data provided to service interfaces of the network device, or
data stored by counters of the network device;
determine, based on the request, a first quantity of the service interfaces and a second quantity of the counters associated with the network device;
determine a first time interval to send delta values of the telemetry data;
determine a second time interval, to send absolute values of the telemetry data, based on the first time interval, the first quantity of the service interfaces, and the second quantity of the counters;
compress the absolute values of the telemetry data, with a serialization technique, prior to providing the absolute values of the telemetry data to the collector device;
provide, to the collector device, the absolute values of the telemetry data based on the second time interval;
compress the delta values of the telemetry data, with the serialization technique, prior to providing the delta values of the telemetry data to the collector device; and
provide, to the collector device, the delta values of the telemetry data based on the first time interval.

15. The non-transitory computer-readable medium of claim 14, wherein the one or more instructions further cause the network device to:
receive, from the collector device, an instruction to perform a corrective action based on the absolute values of the telemetry data and the delta values of the telemetry data; and
perform the corrective action based on the instruction.

16. The non-transitory computer-readable medium of claim 14, wherein the one or more instructions, that cause the network device to determine the first time interval to send the delta values of the telemetry data, cause the network device to:
determine the first time interval to send the delta values of the telemetry data based on a configured time interval for the network device.

17. The non-transitory computer-readable medium of claim 14, wherein the first time interval includes a configured time interval for the network device, and
wherein the second time interval is greater than the first time interval.

18. The non-transitory computer-readable medium of claim 14, wherein the telemetry data indicates a problem associated with the network device, and the one or more instructions further cause the network device to:
receive, from the collector device, an instruction to perform a corrective action for the problem associated with the network device; and
perform the corrective action based on the instruction.

19. The non-transitory computer-readable medium of claim 14, wherein values of particular delta values in a particular first time interval are relative to a previous absolute value in a particular second time interval prior to the particular first time interval.

20. The non-transitory computer-readable medium of claim 14, wherein the second time interval is a multiplier of the first time interval.

\* \* \* \* \*